United States Patent [19]

Heilman et al.

[11] 3,997,499

[45] Dec. 14, 1976

[54] RESIN-FORMING HOMOGENEOUS SOLUTIONS OF STYRENE, MALEIC ANHYDRIDE AND COPOLYMERS THEREOF

[75] Inventors: William J. Heilman, Allison Park, Pa.; Frank C. Peterson, Orange, Tex.; Mical C. Renz, Houston, Tex.; Leslie P. Theard, Houston, Tex.

[73] Assignee: Gulf Oil Corporation, Pittsburgh, Pa.

[22] Filed: June 26, 1975

[21] Appl. No.: 590,430

Related U.S. Application Data

[63] Continuation-in-part of Ser. No. 501,634, Aug. 29, 1974, abandoned.

[52] U.S. Cl. .............. 260/33.6 UA; 260/33.6 EP; 260/34.2; 260/836; 260/837 R; 260/886
[51] Int. Cl.² ................. C08K 5/01; C08L 35/06; C08L 63/02; C08L 63/04
[58] Field of Search .............. 260/30.4 R, 31.2 R, 260/29.1 R, 34.2, 886, 836, 837, 33.6 EP, 33.6 UA, 875

[56] References Cited

UNITED STATES PATENTS

| | | | |
|---|---|---|---|
| 2,047,398 | 7/1936 | Voss et al. | 260/886 |
| 2,548,318 | 4/1951 | Norris | 260/886 |
| 3,046,246 | 7/1962 | Muskat | 260/30.4 R |
| 3,306,954 | 2/1967 | Moore | 260/886 |
| 3,417,162 | 12/1968 | Zimmerman et al. | 260/837 |

*Primary Examiner*—Murray Tillman
*Assistant Examiner*—Thurman K. Page

[57] ABSTRACT

Homogeneous solutions of styrene, maleic anhydride and styrene-maleic anhydride copolymer having a low overall styrene content are prepared. These reactive solutions crosslink with polyfunctional reactants such as diepoxides to form thermoset resins.

10 Claims, No Drawings

RESIN-FORMING HOMOGENEOUS SOLUTIONS OF STYRENE, MALEIC ANHYDRIDE AND COPOLYMERS THEREOF

CROSS-REFERENCE TO RELATED APPLICATIONS

This patent application is a continuation-in-part of our U.S. patent application Ser. No. 501,634, filed Aug. 29, 1974, now abandoned.

FIELD OF THE INVENTION

This invention relates to solutions of styrene, maleic anhydride and styrene-maleic anhydride copolymer and more particularly it relates to clear, homogeneous solutions of styrene, maleic anhydride and styrene-maleic anhydride copolymer which are relatively low in overall styrene content. The solutions can also contain an epoxy cross-linking agent.

DESCRIPTION OF THE PRIOR ART

U.S. Pat. No. 3,306,954 describes a thermosettable liquid resin system for reaction with polyfunctional curing agents which comprises a solution of styrene and styrene-maleic anhydride copolymer having a high overall ratio of styrene to maleic anhydride including a high ratio of styrene to maleic anhydride in the styrene-maleic anhydride copolymer in order to obtain solution. A minor quantity of maleic anhydride monomer is added to the solution in such amount as to maintain the high overall styrene to maleic anhydride ratio as well as to provide a high styrene solvent to maleic anhydride monomer ratio.

SUMMARY OF THE INVENTION

Styrene-maleic anhydride copolymers having a styrene to maleic anhydride mol ratio of between about 1 to 1 and about 2 to 1 are dry solids. The room temperature (25° C.) solubility in styrene of an equimolar copolymer of styrene and maleic anhydride is very low while the solubility of the two to one copolymer is also very low. The solubility of these copolymers in styrene can be increased by heating to an elevated temperature but the resulting solution upon cooling to room temperature becomes extremely viscous.

In contrast, when the styrene-maleic anhydride copolymer possesses a large styrene to maleic anhydride ratio in the copolymer, the copolymer possesses a significant room temperature solubility in styrene. Thus, styrene will dissolve its weight or more of a three to one molar ratio of styrene-maleic anhydride copolymer at room temperature forming a very viscous solution which can be thinned out for use by the addition of more solvent styrene. However, a large ratio of styrene to maleic anhydride in the copolymer lowers the quality of the resulting thermoset product for many uses by lowering its cross-link density. Similarly, a large proportion of solvent styrene in the reaction mixture can lower the quality of the thermoset product by producing a heterogeneous, polystyrene-containing product, by lowering its cross-link density, and the like.

Maleic anhydride is also a dry solid. At room temperature styrene-maleic anhydride solutions can be prepared having a maximum solids content of about 22 weight percent. Larger amounts of maleic anhydride can be dissolved in the styrene at an elevated temperature, but the excess maleic anhydride will precipitate out to a 22 percent content when the solution is cooled to room temperature. However, we have discovered that if the solution of styrene and maleic anhydride is moderately heated to dissolve more than 22 percent maleic anhydride and if the solid styrene-maleic anhydride copolymer is dissolved into the warmed solution, the maleic anhydride in excess of the original 22 percent will stay in solution when the solution is cooled to room temperature.

We have also discovered that a styrene-maleic anhydride solution at a slighty elevated temperature which contains an excess of maleic anhydride over that which is soluble at room temperature will dissolve a surprising excess of low styrene content styrene-maleic anhydride copolymer over the amount which is soluble in styrene alone at that temperature or in a styrene-maleic anhydride solution containing a lesser amount of maleic anhydride at that same temperature. The overall result is a surprising reciprocal solubility effect, that is, the solid maleic anhydride enhances the solubility of the solid styrene-maleic anhydride copolymer and the solid styrene-maleic anhydride copolymer concurrently enhances the solubility of the solid maleic anhydride.

We have made a further advantageous discovery. That is, the presence of the copolymer solubilizing maleic anhydride monomer provides the further surprising effect of producing a resin solution having a substantially lower room temperature viscosity than possessed by a styrene solution of a styrene-maleic anhydride copolymer having the same weight proportion of these two components but no maleic anhydride. Thus, a solution prepared at an elevated temperature from equal amounts by weight of styrene and a 2 to 1 molar ratio styrene-maleic anhydride copolymer will be a putty-like, semi-solid at room temperature. However, this equal parts by weight solution of styrene and this same copolymer can be prepared at a lower temperature with maleic anhydride as a solubility enhancer to form a solution having a room temperature viscosity of less than 1,000 cps. This surprising effect results in a liquid resin reactant having a plurality of desirable advantages, that is, a room temperature solution of styrene, maleic anhydride monomer and low styrene, styrene-maleic anhydride copolymer having a very high solids content of both solids, a relatively low overall styrene content, and a high fluidity.

As a result of our discoveries, we are able to prepare useful resin-forming solutions of styrene, maleic anhydride and styrene-maleic anhydride copolymer having a styrene monomer to maleic anhydride monomer mol ratio as low as about 1:1, preferably as low as about 1.5:1, and no higher than about 4.5:1, preferably no higher than about 3:1, and a styrene to maleic anhydride mol ratio in the styrene-maleic anhydride copolymer of from about 1:1 to about 2:1, preferably about 2:1. Furthermore, in these resin-forming solutions the anhydride equivalent ratio of the maleic anhydride monomer to the styrene-maleic anhydride copolymer is desirably no greater than about 10:1 and preferably no greater than about 5:1 and desirably no less than about 1:2 and preferably no less than about 1:1.

This reactive resin-forming solution can be used soon after its preparation by reaction with a suitable polyfunctional cross-linking agent to form a thermoset resin. Alternatively, this resin-forming solution can be used a substantial period of time after its formation, without significant reaction. particularly if stored at room temperature or lower, preferably with a suitable reaction inhibitor such as hydroquinone, t-butylcatechol, 2,6-di-t-butylphenol, 2,6-di-t-butyl-p-cresol, 2,6-di-t-butyl-4-methylphenol, and the like.

The cross-linking, thermosetting agent can be any suitable polyfunctional reactant which will react with the anhydride groups of the resin-forming solution, such as a polyepoxide, a polyamine, a polyol, and the like, or mixtures thereof. The useful polyols include ethylene glycol, propylene glycol, 1,3-butanediol, 1,6-hexanediol, polyethylene glycol, glycerine, bisphenol A, and the like. The useful polyamines include primary and secondary amines such as diethylenetriamine, triethylenetetramine, 4,4'-methylenedianiline, m-phenylenediamine, piperazine, and the like. Also materials with mixed functional groups such as monoethanolamine, and the like, can be used.

We prefer to use the resin-forming solution with a suitable epoxy curing agent having an epoxy equivalent value greater than one and preferably about two or more. The polyepoxide can be aliphatic, cycloaliphatic, aromatic, heterocyclic, mixtures of these, saturated or unsaturated, and the like. The polyepoxide can be liquid or solid but preferably is soluble in the resin solution, or if not soluble at least it must be capable of forming a homogeneous dispersion in the resin solution. Since the resin-forming solution herein can be formed in a wide range of viscosities, the viscosity of this resin-forming solution and the viscosity of the polyepoxide can be correlated for a predetermined viscosity, if desired, for the polymerization mixture.

This broad class of epoxy resins which is useful in forming the epoxy containing polymer with this resin-forming solution is exemplified by reference to several of the better known types. The glycidyl group of epoxy resins is an important and useful type of epoxy resin. This group includes the glycidyl ethers, the glycidyl esters, the glycidyl amines, and the like. The glycidyl ethers include the glycidyl ethers of mononuclear polyhydric phenols, polynuclear polyhydric phenols and the aliphatic polyols. They may be single compounds or more commonly are a mixture of compounds, some of which are polymeric in nature. Illustrative of glycidyl ethers are the di- or polyglycidyl ethers of ethylene glycol; trimethylene glycol; glycerol; diglycerol; erythritol; mannitol; sorbitol; polyallyl alcohol; butanediol; hydrogenated bisphenol A; and the like.

The glycidyl ethers of polyhydric phenols include the glycidyl ethers of resorcinol; hydroquinone; catechol; pyrogallol; and the like as well as the glycidyl ethers of polynuclear phenols such as bisphenol A; bis(4-hydroxyphenyl)methane; and the like, and glycidyl ethers of the novolac resins such as bisphenol F and the like. The epoxy resins also include epoxidized olefins generally based on naturally ocurring oils, such as epoxidized soybean oil, epoxidized cotton seed oil, epoxidized castor oil, epoxidized linseed oil, epoxidized menhaden oil, epoxidized lard oil and the like, but also including epoxidized butadiene, epoxidized polybutadiene, and the like.

Additional useful epoxy resins are diglycidyl isophthalate; triglycidyl p-aminophenol; diglycidyl phenyl ether; triglycidyl ether of trihydroxybiphenyl; diglycidyl ether of bisphenol PA; triglycidoxy-1,1,3-triphenylpropane; and the like. Further examples of epoxy resins are vinylcyclohexenedioxide; limonene dioxide; 2,2-bis(3,4-epoxycyclohexyl)-propane; diglycidyl ether; bis(2,3-epoxycyclopentyl)ether; dicyclopentadiene dioxide; 3,4-epoxycyclohexylmethyl-(3,4-epoxy)cyclohexane carboxylate; and the like. Further information on these epoxy resins and additional examples of useful epoxy resins are discussed and/or referred to in HANDBOOK OF EPOXY RESINS by H. Lee and K. Neville, McGraw-Hill Book Co., 1967.

When used to make a cured resin, the solution is mixed with the cross-linking agent and a suitable free radical initiator to initiate the olefinic double bond polymerization. Suitable free radical initiators include benzoyl peroxide, methyl ethyl ketone peroxide promoted with cobalt naphthenate, 2,2'-azobis-(isobutyronitrile), and the like. When a polyepoxide is used as the thermosetting reactant, it is desirably used with a suitable anhydride accelerator for promoting the anhydride-epoxy reaction, such as a tertiary amine. Suitable tertiary amines include benzyldimethylamine, N-ethylmorpholine, 3-picoline and the like. It is preferred that the ratio of the anhydride equivalents to the functional equivalents in the cross-linking agent be about 1:1. However, substantial variation in the equivalents can be utilized. Thus, the ratio of equivalents, commonly designated the A/E ratio in the case of a polyepoxide curing agent, can effectively range from about 0.3:1 to about 1.5:1, or broader.

The liquid polymerization solution can be used as a casting resin and cured to a hard, clear thermoset. It can also be mixed with suitable reinforcing material such as chopped glass fibers, vegetable fibers, asbestos fibers, filler material such as powdered calcium carbonate or silica, and the like, or formed into a laminate with glass cloth. The liquid resin mixture can be cured in one stage or in several stages using a temperature between about 65° C. and about 220° C., preferably about 140° C. to about 190° C. for sufficient time to effect substantially complete cure. This resin mixture can be cured without the application of pressure or it can be mold cured under pressure.

In preparing the resin-forming solution the styrene and maleic anhydride, whether in the powdered briquette or molten form, are mixed together in the desired proportions at a temperature ranging from about 25° C. up to about 100° C. or higher, as desired, to obtain solution and then the desired amount of powdered styrene-maleic anhydride copolymer is dissolved therein. Also, the three components can be mixed together in the desired proportions at a temperature ranging from about 25° C. up to about 100° C. or higher, as desired, to obtain solution. When the solution is to be used shortly following its preparation, it is also possible to dissolve the curing agent in the initial resin mixture. However, if the curing agent is a polyepoxide, the four component solution can be stored for a substantial period of time provided there is no tertiary amine or other anhydride accelerator present and provided that there is a free radical inhibitor present. In order to enhance the storage stability of this four component solution, it is desirable to substantially minimize or eliminate the active hydrogen content, particularly in the form of free water, hydroxyl and carboxyl, sufficient to prevent substantial anhydride-epoxy reaction during storage. When use of this resin solution is desired, it can then be mixed with a free radical initiator, an anhydride accelerator, if required, and reinforcing material and filler as desired.

DESCRIPTION OF PREFERRED EMBODIMENTS

The expression 1/1 SMA as used in the following examples is a designation for a styrene-maleic anhydride copolymer having a molar ratio of styrene to maleic anhydride of about one to one and 2/1 SMA has a molar ratio of styrene to maleic anhydride of about two to one. These materials were obtained from Arco Chemical Company of Philadelphia, Pa. Epon 826 is a diglycidyl ether of bisphenol A having an epoxy equivalent weight of about 184 which is sold by Shell Chemical Company.

EXAMPLE 1

The solubility of maleic anhydride in 100 grams of styrene stabilized against polymerization with 0.4 gram of t-butylcatechol was determined by introducing powdered maleic anhydride portionwise into the styrene in an Erlenmeyer flask until no further material appeared to dissolve. An excess of the solid was added and the mixture was stirred overnight with a magnetic bar. The undissolved solid was separated by filtration and dried. The solubility of the dissolved maleic anhydride was found by difference to be 28.1 grams at 25° C. and 54.0 grams at 37.8° C. Upon cooling the second solution to 25° C., maleic anhydride precipitated out forming a 21.9 weight percent (28.1 grams) solution of maleic anhydride.

EXAMPLE 2

The solubility of styrene-maleic anhydride copolymer in a solution containing 100 grams of styrene (S), 0.4 gram of t-butylcatechol and different amounts of maleic anhydride (MA) was determined at 25° C. in the same manner as described in Example 1. The results of these experiments are set forth in Table I:

Table I

| Run | S,g. | MA,g. | 1/1 SMA,g. | 2/1 SMA,g. |
|---|---|---|---|---|
| 1 | 100 | — | 0.1 | — |
| 2 | 100 | 5 | 0.3 | — |
| 3 | 100 | 28 | 2.6 | — |
| 4 | 100 | — | — | 3.7 |
| 5 | 100 | 5 | — | 4.6 |
| 6 | 100 | 28 | — | 9.7 |

EXAMPLE 3

The solubility at 37.8° C. of styrene-maleic anhydride copolymer into a solution containing 100 grams of styrene and varying amounts of maleic anhydride, also stabilized with 0.4 gram of t-butylcatechol was determined in the same manner as described in Example 1. The results of these experiments are set out in Table II:

Table II

| Run | S,g. | MA,g. | 1/1 SMA,g. | 2/1 SMA,g. |
|---|---|---|---|---|
| 7 | 100 | — | 0.7 | — |
| 8 | 100 | 28 | 0.9 | — |
| 9 | 100 | 54 | 150 | — |
| 10 | 100 | — | — | 5.5 |
| 11 | 100 | 28 | — | 9.7 |
| 12 | 100 | 40 | — | 47 |
| 13 | 100 | 54 | — | 200 |

In runs 9 and 13 the solubility of the styrene-maleic anhydride copolymer was greater than indicated, but addition was stopped because of the viscosity of the solution. The 25° C. Brookfield viscosities of the solutions of Runs 9 and 13 were determined to be 48,000 cps. and 30,000 cps., respectively.

EXAMPLE 4

A series of runs were carried out to study the solubility and viscosity effects of different proportions of styrene, maleic anhydride, and styrene-maleic anhydride copolymer. In preparing these solutions the styrene was placed in a blender and the desired amount of maleic anhydride was added with stirring until it dissolved. The styrene-maleic anhydride copolymer was slowly added to this solution (to the styrene directly in Run 14) until it was dissolved. Due to the viscosity of the solution and the time for obtaining solution there was a temperature rise resulting from the shearing forces in the blender. The time for obtaining solution and the final temperature were four minutes, eight seconds and 50° C., respectively, for Run 14 with a general decrease to two minutes and 32° C., respectively, for Run 20. The results including the Brookfield viscosities are set forth in Table III:

Table III

| Run | S,g. | MA,g. | 2/1 SMA,g. | Visc., cps.,25° C. |
|---|---|---|---|---|
| 14 | 150 | — | 153 | putty-like |
| 15 | 150 | 5.5 | 153 | 79,000 |
| 16 | 150 | 12.4 | 153 | 31,600 |
| 17 | 150 | 21.0 | 153 | 8,100 |
| 18 | 150 | 33.0 | 153 | 2,975 |
| 19 | 150 | 49.5 | 153 | 890 |
| 20 | 150 | 74.0 | 153 | 333 |

EXAMPLE 5

A further series of runs were carried out to study the solubility and viscosity effects using different proportions but the same procedures described in Example 4. In these experiments the solution time and final temperatures ranged from 6 minutes and 62° C. in Run 21 to 2 minutes, three seconds and 40° C. in Run 27. These results are set out in Table IV:

Table IV

| Run | S,g. | MA,g. | 2/1 SMA,g. | Visc., cps.,25° C. |
|---|---|---|---|---|
| 21 | 84 | 0 | 153 | putty-like |
| 22 | 84 | 5.5 | 153 | putty-like |
| 23 | 84 | 12.4 | 153 | putty-like |
| 24 | 84 | 21.0 | 153 | "like cold honey" |
| 25 | 84 | 33.0 | 153 | 59,000 |
| 26 | 84 | 49.5 | 153 | 11,750 |
| 27 | 84 | 74.0 | 153 | 3,100 |

It is noted that the method as described for obtaining solution in Examples 2 and 3 is different from the method described in Examples 4 and 5, particularly regarding the severity of mixing. We have determined that the results within each mixing method are directly comparable. However, because of the different methods involved, a direct comparison of results between the two methods, especially those results not involving maleic anhydride, may not be completely practicable.

EXAMPLE 6

A clear solution was obtained by mixing 3.75 kg. of styrene, 1.8 kg. of maleic anhydride, 3.825 kg. of 2/1 styrenemaleic anhydride copolymer and 5.625 kg. of Epon 826 in a vessel under the action of a higher shear mixer. To 3,000 g. of this solution were added 7.5 g. of 1-methylimidazole and 37.5 g. of 2,2'-azobis(2,4-dimethylvaleronitrile) catalyst. Fiber glass rovings were impregnated to a 30 percent resin content by passing them through this solution. The impregnated strands of roving were wound around an aluminum mandrel with axial reciprocation forming a cylindrical shape. This cylinder was cut in an axial direction and laid flat on a thin steel plate. The resulting sheet was about 10 in. by 12 in. by 1/8 in. (25.4 cm by 30.5 cm by 3.2 mm.) with the cut ends of the crisscrossing strands located at the opposite cut edges. The plate and resin-fiber glass sheet were placed in an oven at 350° F. (176.7° C.) and cured for 30 minutes at this temperature. Specimens cut from the cured material were found to possess at room temperature an average flexural strength of 43,600 psi. (3,070 kg./cm$^2$) and an average tensile strength of 50,230 psi. (3,530 kg./cm$^2$).

In order to evaluate the possible effect of the diepoxide on the solubility of the styrene-maleic anhydride copolymer, 50 grams of Epon 826 were dissolved in 50 grams of styrene at 25° C. To this solution 50 grams of 2/1 SMA were added and the mixture was stirred in a blender because it was too viscous to be stirred with a magnetic stirrer. The resulting mixture was allowed to stand at 25° C. whereupon it resolved into two clear layers, the upper layer containing 100 ml. and the lower layer 50 ml. This indicates that the maleic anhydride was essential for obtaining a true solution.

It is to be understood that the above disclosure is by way of specific example and that numerous modifications and variations are available to those of ordinary skill in the art without departing from the true spirit and scope of the invention.

We claim:

1. A homogeneous solution of styrene, maleic anhydride and a styrene-maleic anhydride copolymer comprising a mol ratio of styrene to maleic anhydride of about 1:1 to about 4.5:1, a mol ratio of styrene to maleic anhydride in the said styrene-maleic anhydride copolymer of about 1:1 to about 2:1 and an anhydride equivalent ratio of maleic anhydride to styrene-maleic anhydride copolymer of about 1:2 to about 10:1.

2. A homogeneous solution in accordance with claim 1 in which the said mol ratio of styrene to maleic anhydride is between about 1.5:1 and about 3:1.

3. A homogeneous solution in accordance with claim 1 in which the said anhydride equivalent ratio of maleic anhydride to styrene-maleic anhydride copolymer is between about 1:1 and 5:1.

4. A homogeneous solution in accordance with claim 1 in which the mol ratio of styrene to maleic anhydride in the said styrene-maleic anhydride copolymer is about 2:1.

5. A homogeneous solution in accordance with claim 1 comprising a 1,2-epoxy resin having an epoxy functionality greater than 1 and having between about 0.3 and about 1.5 anhydride equivalents per epoxy equivalent.

6. A homogeneous solution in accordance with claim 5 in which said 1,2-epoxy resin has an epoxy functionality of about 2.

7. A homogeneous solution comprising styrene and maleic anhydride in a mol ratio of about 2:1 and a styrene-maleic anhydride copolymer having a styrene to maleic anhydride mol ratio of about 2:1 in an amount to result in an anhydride equivalent ratio of said maleic anhydride to said styrene-maleic anhydride of about 1.5:1.

8. A homogeneous solution in accordance with claim 7 comprising a diepoxide in an amount to form a total anhydride equivalent to epoxy equivalent ratio of about 1.0.

9. A method of making a homogeneous solution of styrene, maleic anhydride and styrene-maleic anhydride copolymer which comprises dissolving maleic anhydride in styrene at a mol ratio of styrene to maleic anhydride of between about 1:1 and about 4.5:1, and then dissolving an amount of a styrene-maleic anhydride copolymer having a styrene to maleic anhydride mol ratio of between about 1:1 and about 2:1 to produce in said solution an anhydride equivalent ratio of maleic anhydride to the styrene-maleic anhydride copolymer of about 1:2 to about 10:1.

10. A method of making a homogeneous solution of styrene, maleic anhydride and styrene-maleic anhydride copolymer which comprises concurrently dissolving maleic anhydride and a styrene-maleic anhydride copolymer in styrene, said styrene to maleic anhydride mol ratio being between about 1:1 and about 4.5:1, the styrene to maleic anhydride mol ratio in said styrene-maleic anhydride copolymer being between about 1:1 and about 2:1 and the anhydride equivalent ratio of said maleic anhydride to said styrene-maleic anhydride copolymer being between about 1:2 and about 10:1.

* * * * *